(12) United States Patent
Sakai et al.

(10) Patent No.: US 7,165,034 B2
(45) Date of Patent: Jan. 16, 2007

(54) INFORMATION PROCESSING APPARATUS AND METHOD, AND PROGRAM

(75) Inventors: Keiichi Sakai, Kanagawa (JP); Tetsuo Kosaka, Yamagata (JP)

(73) Assignee: Canon Kabushiki Kaisha, Tokyo (JP)

(*) Notice: Subject to any disclaimer, the term of this patent is extended or adjusted under 35 U.S.C. 154(b) by 106 days.

(21) Appl. No.: 10/653,210

(22) Filed: Sep. 3, 2003

(65) Prior Publication Data

US 2004/0044523 A1    Mar. 4, 2004

Related U.S. Application Data

(63) Continuation of application No. PCT/JP02/02584, filed on Mar. 19, 2002.

(30) Foreign Application Priority Data

Mar. 22, 2001 (JP) ............................ 2001-083038
Dec. 19, 2001 (JP) ............................ 2001-386192

(51) Int. Cl.
G10L 21/06 (2006.01)

(52) U.S. Cl. .................. 704/276; 704/275; 715/507

(58) Field of Classification Search ............... 704/235, 704/251, 254, 257, 260, 270
See application file for complete search history.

(56) References Cited

U.S. PATENT DOCUMENTS

| | | | |
|---|---|---|---|
| 4,710,763 A | 12/1987 | Franke et al. | |
| 5,619,708 A | 4/1997 | Ho | |
| 5,787,414 A * | 7/1998 | Miike et al. | 707/2 |
| 6,044,347 A * | 3/2000 | Abella et al. | 704/272 |
| 6,246,981 B1 * | 6/2001 | Papineni et al. | 704/235 |
| 6,366,886 B1 * | 4/2002 | Dragosh et al. | 704/270.1 |
| 6,510,411 B1 * | 1/2003 | Norton et al. | 704/254 |
| 6,745,165 B1 * | 6/2004 | Lewis et al. | 704/275 |

FOREIGN PATENT DOCUMENTS

| | | |
|---|---|---|
| EP | 0 872 827 A2 | 10/1998 |
| JP | 61-221830 | 10/1986 |
| JP | 7-93124 | 4/1995 |
| JP | 8-129476 | 5/1996 |
| JP | 11-120269 | 4/1999 |
| JP | 11-228047 | 8/1999 |
| WO | WO 98/43181 | 10/1998 |
| WO | WO 00/20962 | 4/2000 |

OTHER PUBLICATIONS

David Goddeau, et al., "A Form-Based Dialogue Manager for Spoken Language Applications", MIT Laboratory for Computer Science, pp. 701-704, Oct. 3, 1996.
James D. Foley, et al., "Computer Graphics: Principles and Practice," Second Edition in C, 1997, pp. 352-353, 362-363.
"Dragon Naturally Speaking 5" User's Guide (Dragon Systems, Lernout & Hauspie Speech Products), Aug. 2000.
English-language translation of Japanese Office Action issued on May 22, 2006 in counterpart foreign application.

* cited by examiner

*Primary Examiner*—Abul K. Azad
(74) *Attorney, Agent, or Firm*—Fitzpatrick, Cella, Harper & Scinto

(57) ABSTRACT

Input form information associated with an input form is stored in a form name holding unit. Input speech is recognized by a speech recognition unit, and input form information corresponding to that speech recognition result is selected. The display pattern of an input form corresponding to the selected input form information is controlled by a GUI display unit.

13 Claims, 18 Drawing Sheets

FIG. 3

| INPUT FORM | PRONUNCIATION |
|---|---|
| ID NUMBER | aɪdiː nʌmbɚ |
| NAME | neɪm |
| GENDER | dʒendɚ |
| HOME ADDRESS | houm ədres |
| TELEPHONE NUMBER | teləfoun nʌmbɚ |
| PORTABLE PHONE/PHS | pɔɚtəbl foun / piː eɪtʃ es |
| FAX | fæks |
| E-mail | iːmeɪl |
| OCCUPATION | akjupeɪʃən |
| ORGANIZATION NAME | ɔɚgənɪzeɪʃən neɪm |
| AFFILIATION | əfɪlieɪʃən |
| POSITION | pəzɪʃən |
| ADDRESS | ədres |

FIG. 6

PERSONAL REGISTRATION DATA

ID NUMBER — 6
NAME — 7
GENDER MALE ○ FEMALE ○ — 8, 9
HOME ADDRESS
TELEPHONE NUMBER — 10
PORTABLE PHONE/PHS — 11
FAX — 12
E-MAIL — 13

OCCUPATION BUSINESS MAN ○ CIVIL SERVANT ○ HOUSE WIFE ○ STUDENT ○ OTHER ○ — 14

ORGANIZATION NAME — 15
AFFILIATION — 16
ADDRESS — 17
POSITION — 18
TELEPHONE NUMBER — 19
PORTABLE PHONE/PHS — 20
FAX — 21
E-MAIL — 22

SUBMIT — 23

FIG. 7

PERSONAL REGISTRATION DATA

| ID NUMBER | 1234 — 6 |
| NAME | — 7 |
| HOME ADDRESS | — 9 |
| TELEPHONE NUMBER | — 10 | PORTABLE PHONE/PHS — 11 |
| FAX | — 12 | E-MAIL — 13 |

OCCUPATION BUSINESS MAN ○  CIVIL SERVANT ○  HOUSE WIFE ○  STUDENT ○  OTHER ○ } 14

GENDER MALE ○  FEMALE ○ } 8

| ORGANIZATION NAME | — 15 |
| AFFILIATION | — 16 | POSITION — 17 |
| ADDRESS | — 18 |
| TELEPHONE NUMBER | — 19 | PORTABLE PHONE/PHS — 20 |
| FAX | — 21 | E-MAIL — 22 |

[SUBMIT] — 23

FIG. 8

PERSONAL REGISTRATION DATA

| ID NUMBER | 1234 — 6 | | |
|---|---|---|---|
| NAME | ICHIRO SUZUKI — 7 | GENDER | MALE ◎ FEMALE ○ } 8 |
| HOME ADDRESS | 1-2-3, ZZZ CHO, x x-KU, YOKOHAMA CITY ⋯ 9 | | |
| TELEPHONE NUMBER | 045-678-XXXX — 10 | PORTABLE PHONE/PHS | — 11 |
| FAX | — 12 | E-MAIL | — 13 |

OCCUPATION BUSINESS MAN ○ CIVIL SERVANT ○ HOUSE WIFE ○ STUDENT ◎ OTHER ○ } 14

| ORGANIZATION NAME | DEKOBOKO UNIVERSITY — 15 | POSITION | — 17 |
|---|---|---|---|
| AFFILIATION | ABC UNIVERSITY XYZ DEPARTMENT — 16 | | — 18 |
| ADDRESS | 4-5, AAA CHO, BBB-KU, TOKYO | | |
| TELEPHONE NUMBER | 030-4567-XXXX — 19 | PORTABLE PHONE/PHS | 030-4567-XXXX — 20 |
| FAX | — 21 | E-MAIL | suzuki@dekoboko.ac.jp — 22 |

SUBMIT — 23

FIG. 9

PERSONAL REGISTRATION DATA

| ID NUMBER | 1234 — 6 |
| NAME | ICHIRO SUZUKI — 7    GENDER  MALE ◎  FEMALE ○  } — 8 |
| HOME ADDRESS | 1-2-3, ZZZ CHO, ××-KU, YOKOHAMA CITY — 9 |
| TELEPHONE NUMBER | 045-678-XXXX — 10    PORTABLE PHONE/PHS — 11 |
| FAX | — 12    E-MAIL — 13 |

OCCUPATION  BUSINESS MAN ○  CIVIL SERVANT ○  HOUSE WIFE ○  STUDENT ◎  OTHER ○ — 14

| ORGANIZATION NAME | DEKOBOKO UNIVERSITY — 15 |
| AFFILIATION | ABC UNIVERSITY XYZ DEPARTMENT — 16    POSITION — 17 |
| ADDRESS | 4-5, AAA CHO, BBB-KU, TOKYO — 18 |
| TELEPHONE NUMBER | 030-4567-XXXX — 19    PORTABLE PHONE/PHS — 20 |
| FAX | 030-4567-XXXX — 21    E-MAIL  suzuki@dekoboko.ac.jp — 22 |

SUBMIT — 23

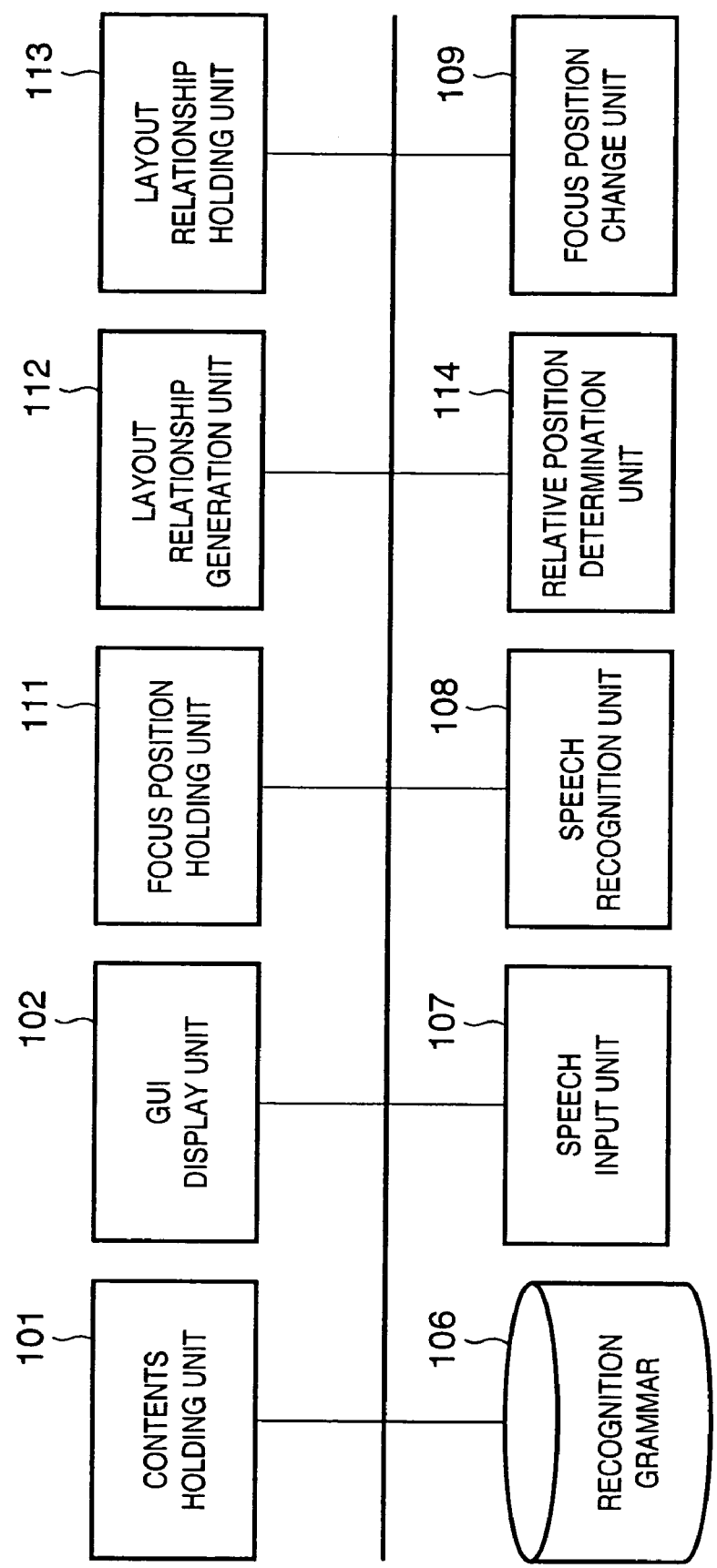

FIG. 11

| INPUT FORM NAME | LAYOUT |
|---|---|
| ID NUMBER | (1, 1) |
| NAME | (2, 1) |
| GENDER | (2, 3) |
| HOME ADDRESS | (3, 1) |
| TELEPHONE NUMBER | (4, 1) |
| PORTABLE PHONE/PHS | (4, 2) |
| FAX | (5, 1) |
| E-mail | (5, 2) |
| OCCUPATION | (6, 1) |
| ORGANIZATION NAME | (7, 1) |
| AFFILIATION | (8, 1) |
| POSITION | (8, 2) |
| ADDRESS | (9, 1) |
| TELEPHONE NUMBER | (10, 1) |
| PORTABLE PHONE/PHS | (10, 2) |
| FAX | (11, 1) |
| E-mail | (11, 2) |

FIG. 13

PERSONAL REGISTRATION DATA

ID NUMBER: 1234 — 6
NAME: ICHIRO SUZUKI — 7
GENDER: MALE ◎ FEMALE ○ — 8
HOME ADDRESS: 1-2-3, ZZZ CHO, ××-KU, YOKOHAMA CITY — 9
TELEPHONE NUMBER: 045-678-XXXX — 10
PORTABLE PHONE/PHS — 11
FAX — 12
E-MAIL — 13

OCCUPATION: BUSINESS MAN ○ CIVIL SERVANT ○ HOUSE WIFE ○ STUDENT ◎ OTHER ○ — 14

ORGANIZATION NAME: DEKOBOKO UNIVERSITY — 15
AFFILIATION: ABC UNIVERSITY XYZ DEPARTMENT — 16
POSITION — 17
ADDRESS: 4-5, AAA CHO, BBB-KU, TOKYO — 18
TELEPHONE NUMBER: 030-4567-XXXX — 19
PORTABLE PHONE/PHS — 20
FAX: 030-4567-XXXX — 21
E-MAIL: suzuki@dekoboko.ac.jp — 22

SUBMIT — 23

FIG. 17

| INPUT FORM NAME | LAYOUT | TYPE OF TAG |
|---|---|---|
| ID NUMBER | (1, 1) | input |
| NAME | (2, 1) | input |
| GENDER | (2, 2) | radio |
| HOME ADDRESS | (3, 1) | input |
| TELEPHONE NUMBER | (4, 1) | input |
| PORTABLE PHONE/PHS | (4, 2) | input |
| FAX | (5, 1) | input |
| E-mail | (5, 2) | input |
| OCCUPATION | (6, 1) | radio |
| ORGANIZATION NAME | (7, 1) | input |
| AFFILIATION | (8, 1) | input |
| POSITION | (8, 2) | input |
| ADDRESS | (9, 1) | input |
| TELEPHONE NUMBER | (10, 1) | input |
| PORTABLE PHONE/PHS | (10, 2) | input |
| FAX | (11, 1) | input |
| E-mail | (11, 2) | input |

FIG. 18

```
< html >
< head >
< title > PERSONAL REGISTRATION DATA < / title >
< / head >
< body >
< SpeechRecog grammer = " command.grm"
              used_tag = " input,radio,a"
>
< center >< h2 > REGISTRATION OF PERSONAL DATA < / h2 >< / center >
< form >
ID NUMBER < input type = text name = "id" >< br >
   . . .
< / form >
< / body >
< / html >
```

{ SPEECH RECOGNITION TAG }

INFORMATION PROCESSING APPARATUS AND METHOD, AND PROGRAM

This application is a continuation application of pending International Application No. PCT/JP02/02584, filed on Mar. 19, 2002.

TECHNICAL FIELD

The present invention relates to an information processing apparatus and method for executing a process on the basis of operation which is made based on input speech with respect to an input form displayed on a display screen.

BACKGROUND ART

When data such as text or the like is input to input fields (input forms) on a GUI (graphic user interface), an input form which is to receive an input is settled by selecting one of a plurality of input forms, and data is then input using a keyboard, or one of a plurality of candidates to be selected is selected using a pointing device such as a mouse or the like to make an input. Also, upon inputting data to such input form, a technique for inputting data by means of speech using a speech recognition technique has been proposed.

However, according to the above prior art, upon inputting data by speech to an input form, an input form which is to receive the data must be selected using a keyboard or mouse. Therefore, speech input and manual input operations must be combined, and the operability is not always good.

DISCLOSURE OF INVENTION

The present invention has been made to solve the aforementioned problems, and has as its object to provide an information processing apparatus and method which can efficiently and flexibly execute operation to an input form displayed on a display window by input speech, and a program.

In order to achieve the above object, an information processing apparatus according to the present invention comprises the following arrangement. That is, there is provided an information processing apparatus for executing a process with respect to an input form displayed on a display screen on the basis of input speech, comprising:

storage means for storing input form information associated with the input form;

speech recognition means for recognizing the input speech; and selection means for selecting input form information corresponding to a speech recognition result of the speech recognition means.

Preferably, the apparatus further comprises display control means for controlling a display pattern of an input form corresponding to the input form information selected by the selection means.

Preferably, the input form information includes an input form name of the input form.

Preferably, the input form information includes layout information indicating a position of the input form.

Preferably, the display control means displays the input form corresponding to the input form information selected by the selection means in a second display pattern which is different from a first display pattern of other input forms.

Preferably, the display control means displays the input form corresponding to the input form information selected by the selection means at the center on the display screen.

Preferably, the apparatus further comprises informing means for, when selection by the selection means is settled, informing that message.

Preferably, the input form information includes an input form name of the input form, and layout information indicating a position of the input form, the apparatus further comprises determination means for determining if the speech recognition result of the speech recognition means corresponds to the input form name or the layout information, and the selection means selects input form information corresponding to the speech recognition result of the speech recognition means on the basis of a determining result of the determination means.

Preferably, the input form information includes layout information indicating a position of the input form, and the speech recognition means recognizes the input speech using speech recognition grammar data used to recognize speech for specifying the layout information.

Preferably, the speech recognition grammar data includes data used to recognize at least one of a relative position expression indicating a relative position of the input form, and an absolute position expression indicating an absolute position of the input form.

Preferably, the speech recognition grammar data includes data used to recognize if the absolute position expression corresponds to overall contents including the input form or a display range on the display screen.

Preferably, when the input form is implemented by a hypertext document, the input form information includes a tag indicating the input form.

Preferably, the hypertext document describes a tag used to execute speech recognition by the speech recognition means.

In order to achieve the above object, an information processing method according to the present invention comprises the following arrangement. That is, there is provided an information processing method for executing a process with respect to an input form displayed on a display screen on the basis of input speech, comprising:

a speech recognition step of recognizing the input speech; and a selection step of selecting input form information associated with the input form, which corresponds to a speech recognition result of the speech recognition step.

In order to achieve the above object, a program according to the present invention comprises the following arrangement. That is, there is provided an program for making a computer function as an information process for executing a process with respect to an input form displayed on a display screen on the basis of input speech, comprising:

a program code of the speech recognition step of recognizing the input speech;

a program code of the selection step of selecting input form information associated with the input form, which corresponds to a speech recognition result of the speech recognition step; and a program code of the display control step of controlling a display pattern of an input form corresponding to the input form information selected in the selection step.

BRIEF DESCRIPTION OF DRAWINGS

FIG. 3 shows an example of an input form information table in Embodiment 1 of the present invention;

FIG. 6 shows an example of a GUI in Embodiment 1 of the present invention;

FIG. 7 shows an example of a GUI in Embodiment 1 of the present invention;

FIG. 8 shows an example of a GUI in Embodiment 1 of the present invention;

FIG. 9 shows an example of a GUI in Embodiment 1 of the present invention;

FIG. 10 is a functional block diagram of an information processing apparatus according to Embodiment 2 of the present invention;

FIG. 11 shows an example of an input form information table in Embodiment 2 of the present invention;

FIG. 13 shows an example of a GUI in Embodiment 2 of the present invention;

FIG. 17 shows an example of an input form information table according to Embodiment 6 of the present invention; and FIG. 18 shows an example of a tag used to execute speech recognition using a markup language according to Embodiment 7 of the present invention.

BEST MODE FOR CARRYING OUT THE INVENTION

Preferred embodiments of the present invention will now be described in detail in accordance with the accompanying drawings.

Figure 1:
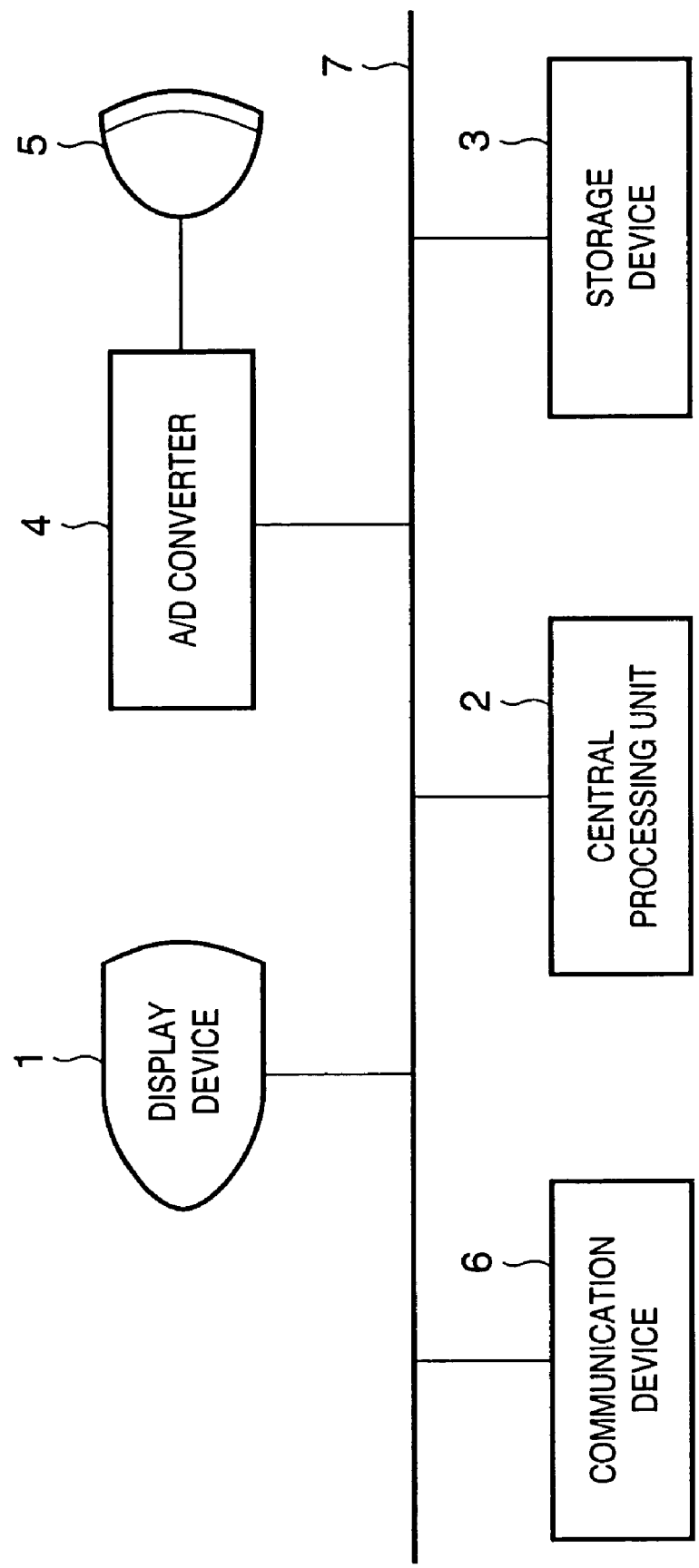
FIG. 1 is a block diagram showing an example of the hardware arrangement of an information processing apparatus according to each embodiment of the present invention.

FIG. 1 is a block diagram showing an example of the hardware arrangement of an information processing apparatus according to each embodiment of the present invention.

In the information processing apparatus, reference numeral 1 denotes a display device for displaying a GUI. Reference numeral 2 denotes a central processing unit such as a CPU or the like for executing processes including numerical arithmetic operations control, and the like. Reference numeral 3 denotes a storage device for storing temporal data and a program required for processing sequences and processes of respective embodiments to be described later, or storing various data such as speech recognition grammar data, speech model, and the like. This storage device 3 comprises an external memory device such as a disk device or the like, or an internal memory device such as a RAM·ROM, or the like.

Reference numeral 5 denotes a microphone for inputting speech uttered by the user. Reference numeral 4 denotes an A/D converter for converting speech data input via the microphone 5 from an analog signal into a digital signal. Reference numeral 6 denotes a communication device which exchanges data with an external device such as a Web server or the like via a network. Reference numeral 7 denotes a bus for interconnecting various building components of the information processing apparatus.

<Embodiment 1>

Figure 2:
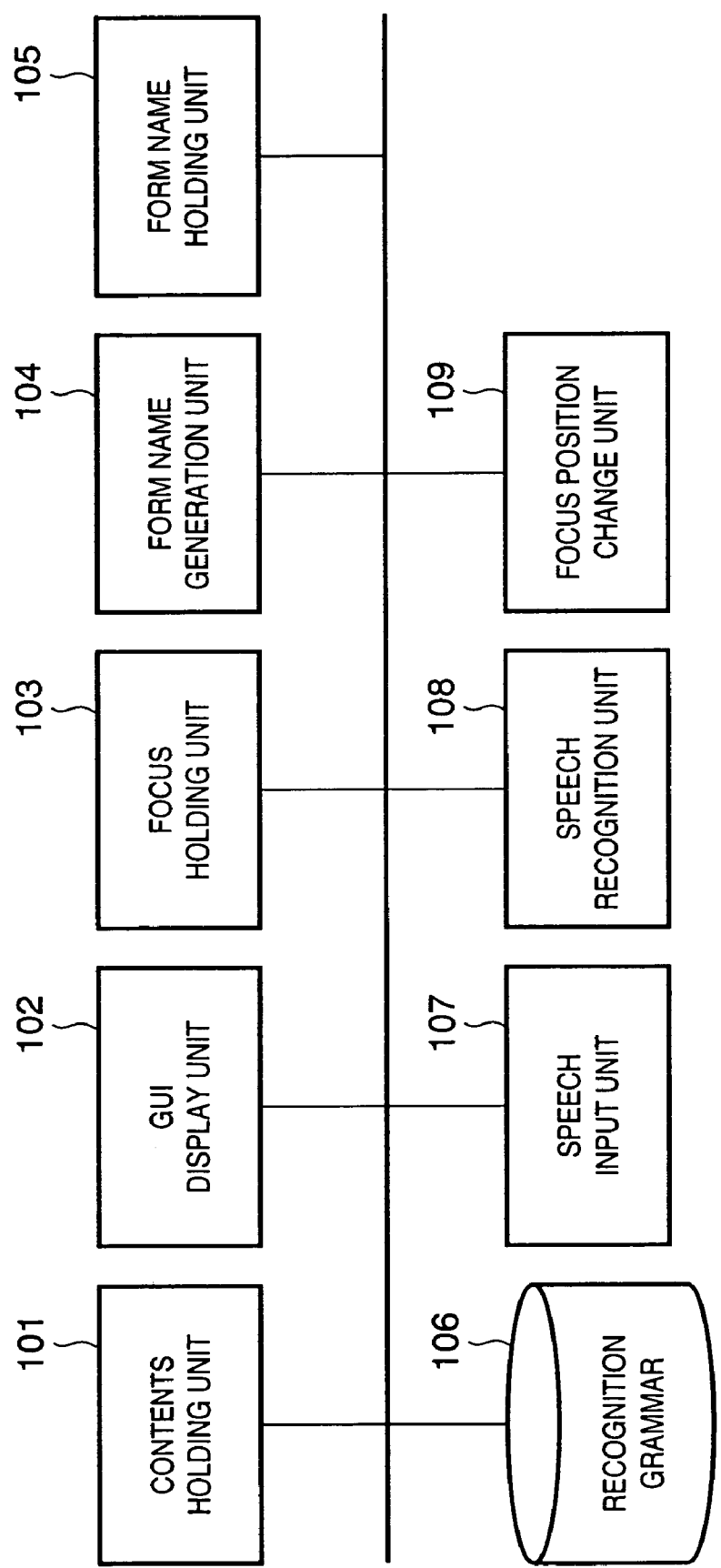
FIG. 2 is a functional block diagram of an information processing apparatus according to Embodiment 1 of the present invention.

FIG. 2 is a functional block diagram of an information processing apparatus according to Embodiment 1 of the present invention.

Reference numeral 101 denotes a contents holding unit for holding contents to be displayed on a GUI, which is implemented by a hypertext document described using a description language (e.g., a markup language of an HTML document or the like). Reference numeral 102 denotes a GUI display unit such as a browser for displaying the contents held in the contents holding unit 101 on the GUI. Reference numeral 103 denotes a focus holding unit for holding an input form focused on various contents displayed on the GUI display unit 102. Reference numeral 104 denotes a form name generation unit for extracting input form names (notations) on the contents displayed on the GUI display unit 102, and giving their pronunciations. The input form names and pronunciations generated by the form name generation unit 104 are held in a form name holding unit 105. In addition, the pronunciations are used as movement recognition grammar data, and the input form names and pronunciations are held in a recognition grammar 106.

FIG. 3 shows an example of an input form information table which stores input form names (notations) and dictionary pronunciations in correspondence with each other to manage information associated with input forms. In FIG. 3, the dictionary pronunciations used for the input form information table is merely illustrative and other type of pronunciations can be used for the input form information table.

Figure 4:
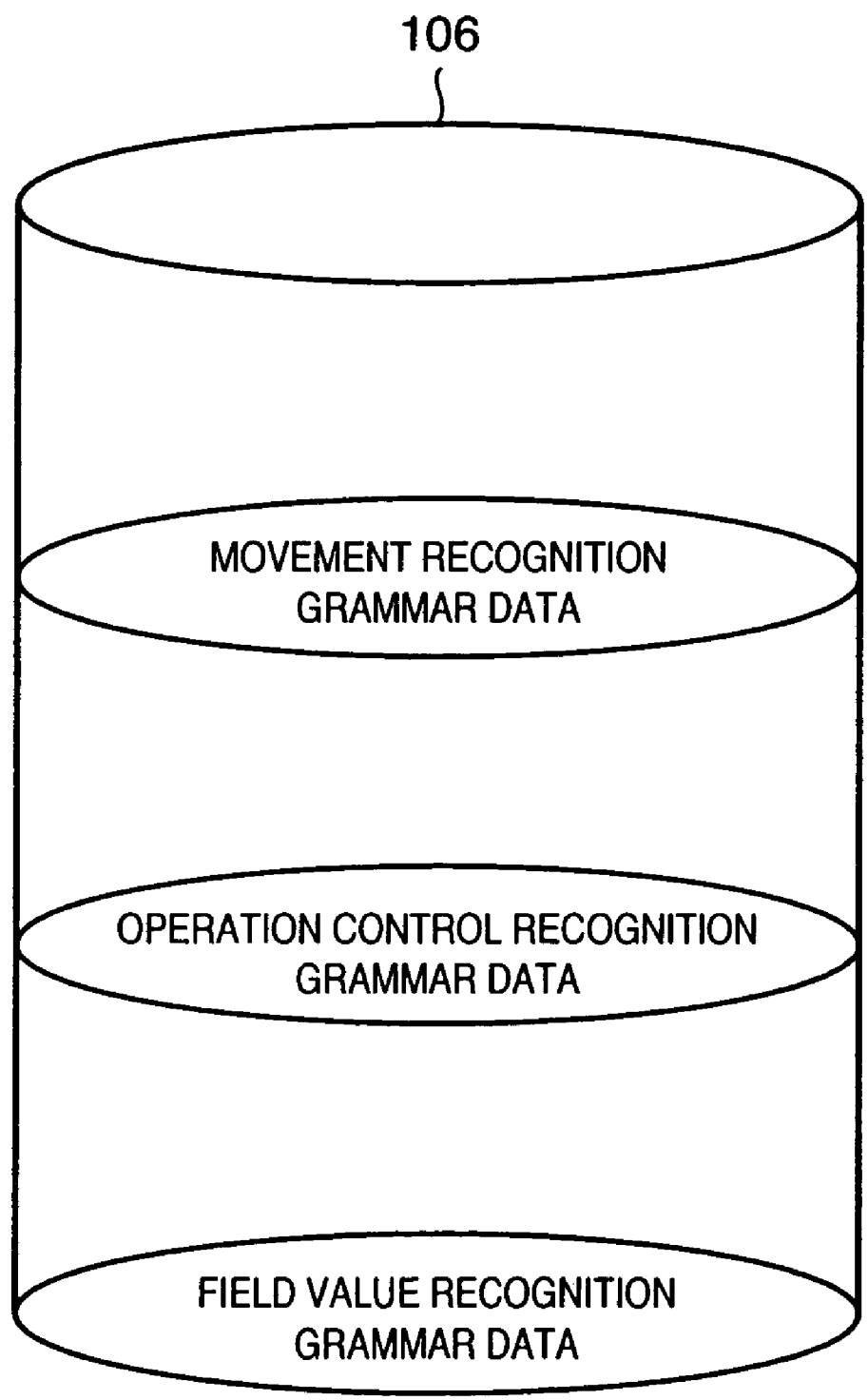
FIG. 4 shows the format of a recognition grammar in Embodiment 1 of the present invention.

FIG. 4 shows the format of the recognition grammar 106.

As shown in FIG. 4, the recognition grammar 106 comprises three kinds of speech recognition grammar data including movement recognition grammar data used to select an input form to be focused by input speech, operation control recognition grammar data for various operations such as a response to confirmation to the user, a help request, and the like, and field value recognition grammar data used to recognize contents input by speech to an input form. These speech recognition grammar data may be combined into a single file or may form independent files.

Note that the speech recognition grammar data may include those which are normally used in speech recognition, such as a word list that describes notations and pronunciations of words in case of single word speech recognition, a network grammar based on CFG (context-free grammar), and the like.

A description will revert to FIG. 2.

Reference numeral 107 denotes a speech input unit which comprises the microphone 5 and the A/D converter 4 for A/D-converting speech data input via the microphone 5. Reference numeral 108 denotes a speech recognition unit for reading out the speech recognition grammar data held in the recognition grammar 106, and making speech recognition of a digital signal input from the speech input unit 107. Reference numeral 109 denotes a focus position change unit for, when the speech recognition result of the speech recognition unit 108 indicates a given input form name, changing the focus position displayed on the GUI display unit 102 with reference to the focus holding unit 103.

The process to be executed by the information processing apparatus of Embodiment 1 will be described below using FIG. 5.

Figure 5:
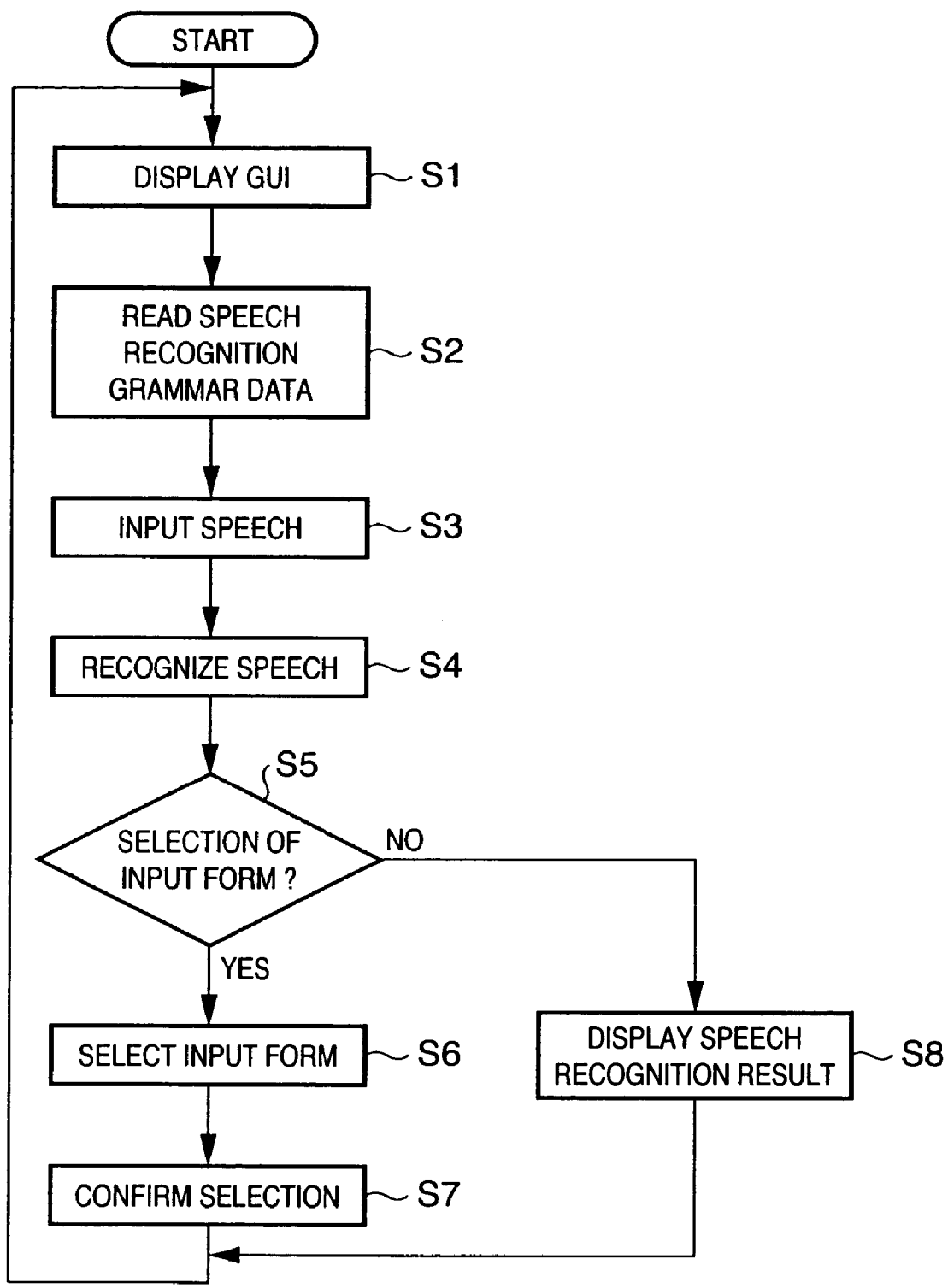
FIG. 5 is a flow chart showing a process executed by the information processing apparatus of Embodiment 1 of the present invention.

FIG. 5 is a flow chart showing the process to be executed by the information processing apparatus of Embodiment 1 of the present invention.

Note that the operations of respective steps in the flow chart of FIG. 5 are stored, for example, as a program, in the storage device 3, and the central processing unit 2 reads out and executes that program.

In step S1, the GUI display unit 102 displays a GUI including a plurality of input forms to be displayed on the display device 1. The GUI may be displayed by loading and displaying external data such as HTML data which is described in a markup language, or may be displayed by only a dedicated program.

An example of the GUI will be described below using FIG. 6.

FIG. 6 shows an example of a GUI including a plurality of input forms to be displayed on the display device 1. This GUI assumes a registration (input/change) GUI of personal registration data as user information that pertains to a given user, and rectangular frames on FIG. 6 are respectively various input forms. For example, an input form 6 is used to input an ID number as character string data. Also, input forms 7, 9 to 13, and 15 to 22 are used to input various character string data. Input forms 8 and 14 are radio-button type input forms used to select desired choice data from those (male, female, business man, and the like) prepared in advance. A button 23 is used to submit various data input to various input forms on the GUI to, e.g., an application.

When these input forms are displayed on the display device 1, the form name generation unit 103 generates their input form names and pronunciations, which are stored as an input form information table in the form name holding unit 104 and recognition grammar 106, as described above.

In case of a server-client type GUI display system including a Web server and a client that installs a Web browser, the process for generating the input form names, which is executed by the form name generation unit 103, may be executed in advance for respective contents on the Web server side, or may be dynamically executed on the Web browser on the client side.

In Embodiment 1, an input form which is to receive data (also referred to as a focused input form hereinafter) is indicated by the broken line (first display pattern), and a non-focused input form is indicated by the solid line (second display pattern). FIG. 6 exemplifies a case wherein the input form 6 is focused.

The registration GUI of personal registration data shown in FIG. 6 is an example for explaining a case wherein the personal registration data are to be changed, and assume that personal registration data before change already exist. Upon changing the personal registration data, when the user inputs the ID number (e.g., 1234) to the input form 6 and presses the submit button 23, as shown in FIG. 7, currently registered personal registration data corresponding to that ID number are displayed, and for example, the input form 9 is focused.

The description will revert to FIG. 5.

In step S2, the speech recognition unit 108 reads out various speech recognition grammar data from the recognition grammar 106 stored in the storage device 3. As described above, the speech recognition grammar data include the movement recognition grammar data used to select an input form to be focused by input speech, operation control recognition grammar data, and field value recognition grammar data used to recognize speech input to the currently focused input form.

In step S3, the speech input unit 107 begins to input speech. Speech uttered by the user is converted into an electrical signal by the microphone 5, and the electrical signal is further converted into a digital signal (speech data) by the A/D converter 4.

In step S4, the speech recognition unit 108 executes speech recognition of the input speech data using the read various speech recognition grammar data. In this case, speech recognition is made using the movement recognition grammar data and field value recognition grammar data, respectively. Since these two speech recognition grammar data are used, speech recognition results are obtained from the respective speech recognition grammar data. These results are compared using numerical values such as likelihood levels that indicate the degrees of certainty of speech recognition, and the speech recognition result with higher degree of certainty is selected as a final speech recognition result.

It is determined in step S5 if the speech recognition result is selection of an input form. That is, it is determined whether or not the likelihood of the speech recognition result obtained using the movement recognition grammar data is higher than that of the speech recognition result obtained using the field value recognition grammar data. If the speech recognition result is not selection of an input form (NO in step S5), the flow advances to step S8 to display the speech recognition result of the speech data input to the focused input form. Since this process is the same as the prior art, a description thereof will be omitted. On the other hand, if speech recognition result is selection of an input form (YES in step S5), the flow advances to step S6.

In step S6, an input form corresponding to the speech recognition result (input form name) is selected. For example, if an input form name "affiliation" or "address" is obtained as the speech recognition result, the flow advances from step S5 to this step S6, and an input form that matches the input form name corresponding to the speech recognition result is specified. FIG. 9 shows an example of a GUI on the display device 1 when the speech recognition result is "affiliation".

In step S7, a selection confirmation operation is made. This is a confirmation process for presenting the selected input form to the user. For example, display control for changing the display pattern of the selected input form to be distinguished from other non-selected input forms by flashing that input form (changing the color of the form for a predetermined period of time) or the like is executed, or display control for scrolling a window to locate the selected input form at the center of the window or the like is executed. In addition, a beep tone may be produced to indicate that the input form is selected.

As described above, according to Embodiment 1, when the user has uttered an input form name, an input form corresponding to the speech recognition result obtained by speech recognition of that utterance can be selected as an input target of data. In this way, the user need not manually select an input form using a keyboard, mouse, or the like, and can select an input form and input data with respect to the GUI by only input speech, thus improving the GUI operability compared to prior art.

<Embodiment 2>

In Embodiment 1, when the user has uttered an input form name, an input form as an input target of data is selected based on the speech recognition result obtained by speech recognition of that speech. Also, when the user has uttered a relative position expression indicating a relative position of an input form, e.g., "third upper" or "second lower", an input form as an input target of data can be selected based on the speech recognition result obtained by speech recognition of that speech.

The functional arrangement of the information processing apparatus according to such embodiment is shown in FIG. 10.

FIG. 10 is a functional block diagram of the information processing apparatus according to Embodiment 2 of the present invention.

Referring to FIG. 10, in addition to the contents holding unit 101, GUI display unit 102, recognition grammar 106, speech input unit 107, and speech recognition unit 108 in FIG. 2 of Embodiment 1, the apparatus has a focus position change unit 109 for changing the focus position when the user has uttered the relative position expression, a focus position holding unit 111 for holding the position of the currently focused input form, a layout relationship generation unit 112 for generating layout information indicating input form names and their positions, a layout relationship holding unit 113 for holding the input form names and layout information held by the layout relationship generation unit 112, and a relative position determination unit 114 for determining if the uttered contents are the relative position expression.

The input form names and layout information generated by the layout relationship generation unit 112 are stored as an input form information table in the storage device 3. FIG. 11 shows an example of that table, which is managed as an input form information table that stores the input form names and layout information (e.g., vertical and horizontal position coordinates when the upper left corner on the GUI is defined as an origin) in correspondence with each other. This input form information table is generated by analyzing contents upon displaying the contents. When contents are delivered from an external apparatus such as a Web server or the like via a network, the input form information table may be generated in advance on the contents provider side, and may be submitted in synchronism with submission of the contents. In addition, in case of a server-client type GUI display system including a Web server and a client that installs a Web browser, the process for generating the input form names and layout information, which is executed by the layout relationship generation unit 112, may be made in advance for respective contents on the Web server side, or may be dynamically made on the Web browser on the client side.

In Embodiment 2, the movement recognition grammar data in the recognition grammar 106 in FIG. 11 contain data required to make speech recognition of the relative position expression, and data used to recognize, for example, numerals, "th", "upper", "lower", "right", "left", "from", and the like are managed.

The process to be executed by the information processing apparatus of Embodiment 2 will be explained below using FIG. 12.

Figure 12:
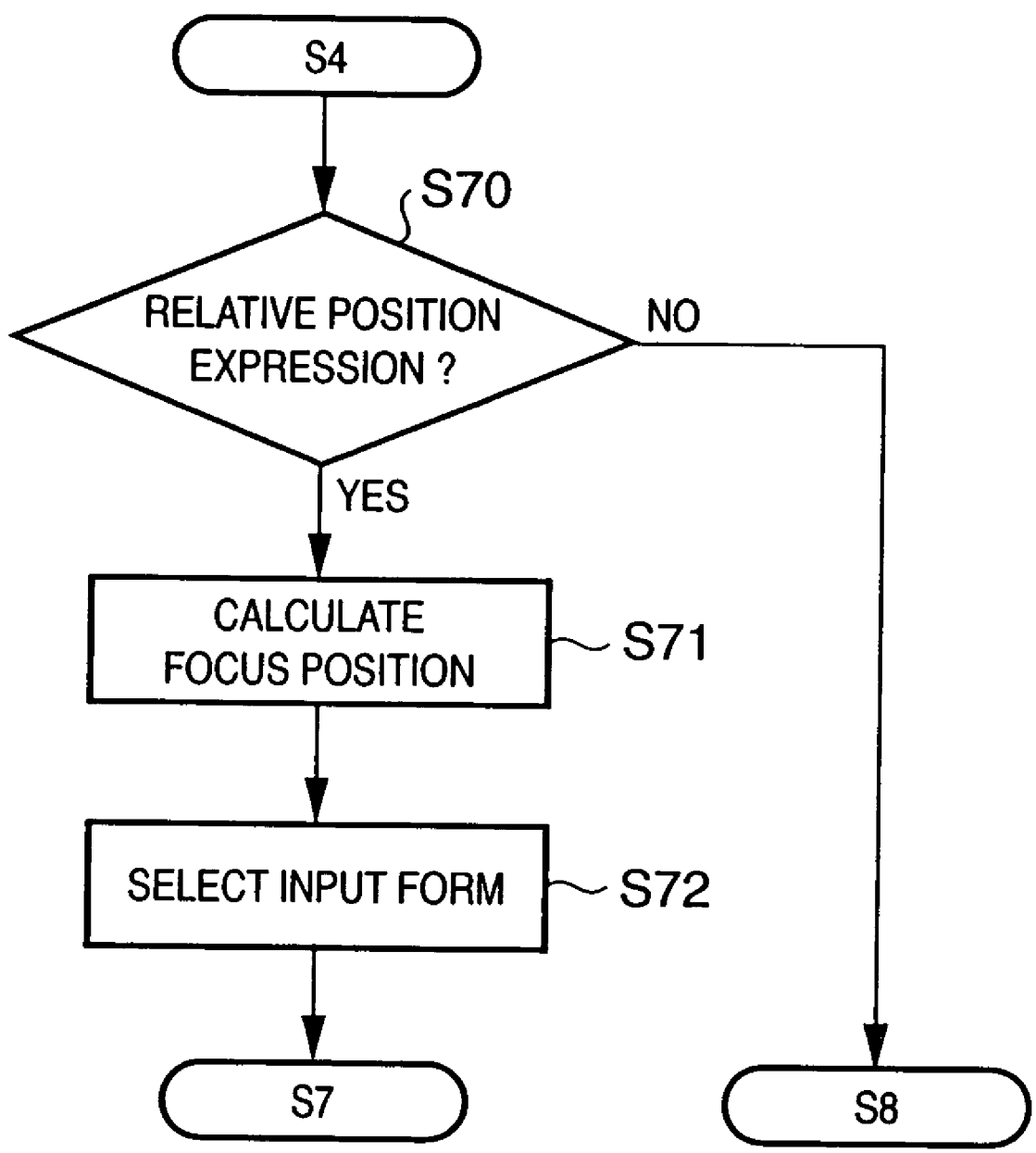
FIG. 12 is a flow chart showing a process executed by the information processing apparatus of Embodiment 2 of the present invention.

FIG. 12 is a flow chart showing the process to be executed by the information processing apparatus of Embodiment 2 of the present invention.

Note that FIG. 12 shows only different portions from the flow chart of FIG. 5 of Embodiment 1.

When the speech recognition unit 108 executes speech recognition of the input speech data with reference to the read recognition grammar 106 in step S4, the relative position determination unit 114 determines in step S70 if that speech recognition result is a relative position expression. That is, it is determined if the likelihood of the speech recognition result obtained using the movement recognition grammar data is higher than that of the speech recognition result obtained using the field value recognition grammar data. Especially, when the likelihood of the speech recognition result obtained using the movement recognition grammar data is higher than that of the speech recognition result obtained using other speech recognition grammar data, it is determined that the speech recognition result is a relative position expression.

If it is determined in step S71 that the speech recognition result is not a relative position expression (NO in step S70), the flow advances to step S8. On the other hand, if the speech recognition result is a relative position expression (YES in step S70), the flow advances to step S71, and the focus position change unit 109 determines an input form designated by the relative position expression. In this case, the input form is determined using the layout information of the currently focused input form, the layout relationship holding unit 113, and the speech recognition result of the relative position expression.

For example, if the currently focused input form is an input form 16 (FIG. 9), the focus position holding unit 111 holds layout information (8, 1) (FIG. 11) of the corresponding input form name "affiliation". If the speech recognition result of speech uttered by the user is "third upper", (5, 1) is determined as the movement destination of the focus position on the basis of the input form information table in FIG. 11. In this way, the layout information held in the focus position holding unit 111 is updated to (5, 1). As a result, as shown in FIG. 13, the focus position is changed from the input form 16 to an input form 12.

As described above, according to Embodiment 2, when the user has uttered a relative position expression that indicates the relative position of an input form, an input form corresponding to the speech recognition result obtained by speech recognition of that utterance can be selected as an input target of data. In this manner, the user need not manually select an input form using a keyboard, mouse, or the like, and can select an input form and input data with respect to the GUI by only input speech, thus improving the GUI operability compared to prior art. The user can select an input form by a simpler speech expression than Embodiment 1 without uttering an input form name, flexible, and precise input form selection by means of input speech can be implemented.

<Embodiment 3>

In Embodiment 2, an input form is selected by the relative position expression. For example, an input form can also be selected by an absolute position expression indicating an absolute position such as "fifth from top" or "second from bottom" uttered by the user.

Figure 14:
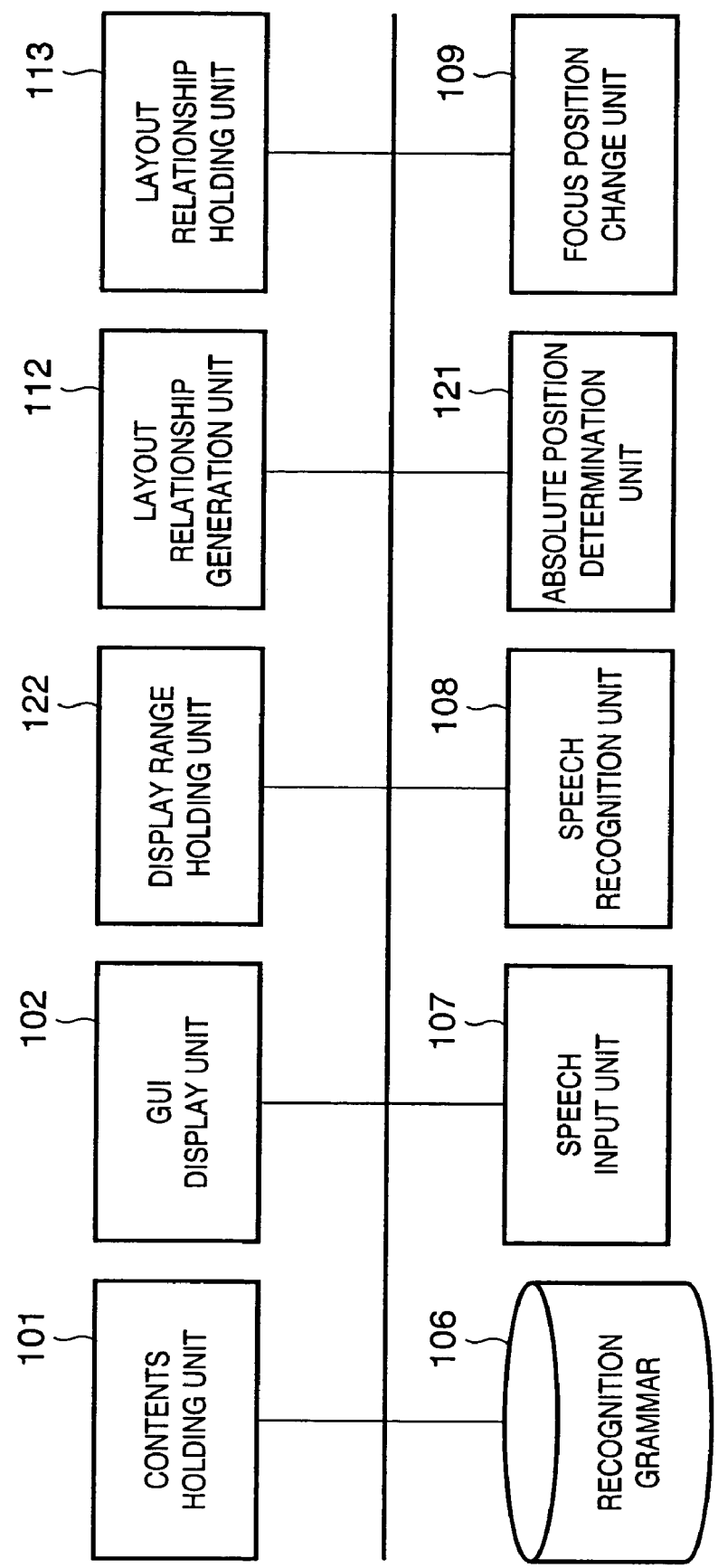
FIG. 14 is a functional block diagram of an information processing apparatus according to Embodiment 3 of the present invention.

The functional arrangement of the information processing apparatus according to such embodiment is shown in FIG. 14.

FIG. 14 is a functional block diagram of the information processing apparatus according to Embodiment 3 of the present invention.

Referring to FIG. 14, in addition to the contents holding unit 101, GUI display unit 102, recognition grammar 106, speech input unit 107, and speech recognition unit 108 in FIG. 2 of Embodiment 1, and the focus position change unit 109, layout relationship generation unit 112, and layout relationship holding unit 113 in FIG. 10 of Embodiment 2, the apparatus comprises an absolute position determination unit 121 and display range holding unit 122. The absolute position determination unit 121 implements a function similar to that of the relative position determination unit 114 in FIG. 10, and determines if the uttered contents are an absolute position expression. Note that the details of the display range holding unit 122 will be explained later as Embodiment 4. The movement recognition grammar data in the recognition grammar 106 contain data required to make speech recognition of the absolute position expression, and data used to recognize "from top", "from bottom", "from right", "from left", numerals, "th", and the like are managed.

The process to be executed by the information processing apparatus of Embodiment 3 is an application of the process executed by the information processing apparatus of Embodiment 1. Especially, in the process in step S6 of the flow chart in FIG. 5 of Embodiment 1, speech uttered by the user is recognized, and the absolute position determination unit 121 selects an input form to be focused with reference to the input form information table in FIG. 11. For example, when the user has uttered "second from bottom", since the maximum value of the vertical position of the input form information table in FIG. 11 is 11, an input form of telephone number with the vertical position=10 is selected, and the focus position is moved to that position. After that, the flow advances to step S7.

As described above, according to Embodiment 3, an input form can be selected by the absolute position expression in place of the relative position expression, and more flexible, precise input form selection by means of input speech can be implemented as in Embodiment 2.

<Embodiment 4>

When contents are browsed on a window application such as a browser or the like or on a portable device with a narrow display region, the GUI display unit 102 can only partially display contents, and the user must scroll the contents to be browsed on the display window using a pointing device such as a mouse or the like. In each of the above embodiments, for example, when the user has uttered "third from top", the apparatus focuses on the third form from the top in the range of the overall contents, but, for example, the apparatus may focus on the third form in the display range of the contents on the display window.

In such case, the display range holding unit 122 in FIG. 14 may hold layout information of the display range currently displayed on the GUI display unit 102, and the absolute position determination unit 121 may determine the absolute position within the display range in the process in step S6 in FIG. 5.

When the user has explicitly uttered an absolute position expression within the display range or that for the overall contents, either expression may be discriminated, and a corresponding operation may be made. In this case, the movement recognition grammar data in the recognition grammar 106 in FIG. 14 contain data required to make speech recognition of these absolute position expressions, and data used to manage, e.g., "overall", "within display range", and the like are managed in addition to those described in Embodiment 3.

In this case, the absolute position of the overall contents or that within the display range in the display range holding unit 122 can be determined based on the speech recognition result if the user has designated like "third from top of overall" or "third from top in display range".

When designation indicating the absolute position of the overall contents or that within the display range is omitted, ambiguity occurs. In such case, either of these absolute positions may be fixed as a prescribed value, or the absolute position may be dynamically changed to the previously designated position. When the absolute position is dynamically changed, designation information for selecting either absolute position may be held in the display range holding unit 122.

The process to be executed by the information processing apparatus of Embodiment 4 is an application of the process executed by the information processing apparatus of Embodiment 1. Especially, in the process in step S6 of the flow chart in FIG. 5 of Embodiment 1, for example, if input forms 9 to 18 of the contents in FIG. 6 are displayed on the GUI display unit 102, the display range holding unit 122 holds an upper left position (3, 1) and lower right position (9, 2) as layout information of the display range.

When the user has uttered "second from bottom", and especially when the display range holding unit 122 is set to adopt the display range as a default, the absolute position determination unit 121 determines layout information (8, 1) of input form name "affiliation" as the second input form from the bottom within the display range with reference to the display range holding unit 122 and the input form information table in FIG. 11, and moves the focus position to that position. On the other hand, when the display range holding unit 122 is set to adopt the overall contents as a default, the absolute position determination unit 121 determines layout information (10, 1) of input form name "telephone number" as the second input form from the bottom of the entire contents, and moves the focus position to that position.

As described above, according to Embodiment 4, the absolute position expression of the overall contents/absolute position expression within the display range is explicitly or automatically input by speech, and an input form can be selected by that input speech. In addition to the effects described in Embodiment 3, more flexible, precise input form selection by means of input speech according to the displayed display range can be implemented.

<Embodiment 5>

As the movement recognition grammar data in Embodiments 1 to 4 above, only data required to realize each embodiment are managed. Alternatively, the movement recognition grammar data may be configured to be able to select an input form by any of the input form name, relative position expression, and absolute position expression.

Figure 15:
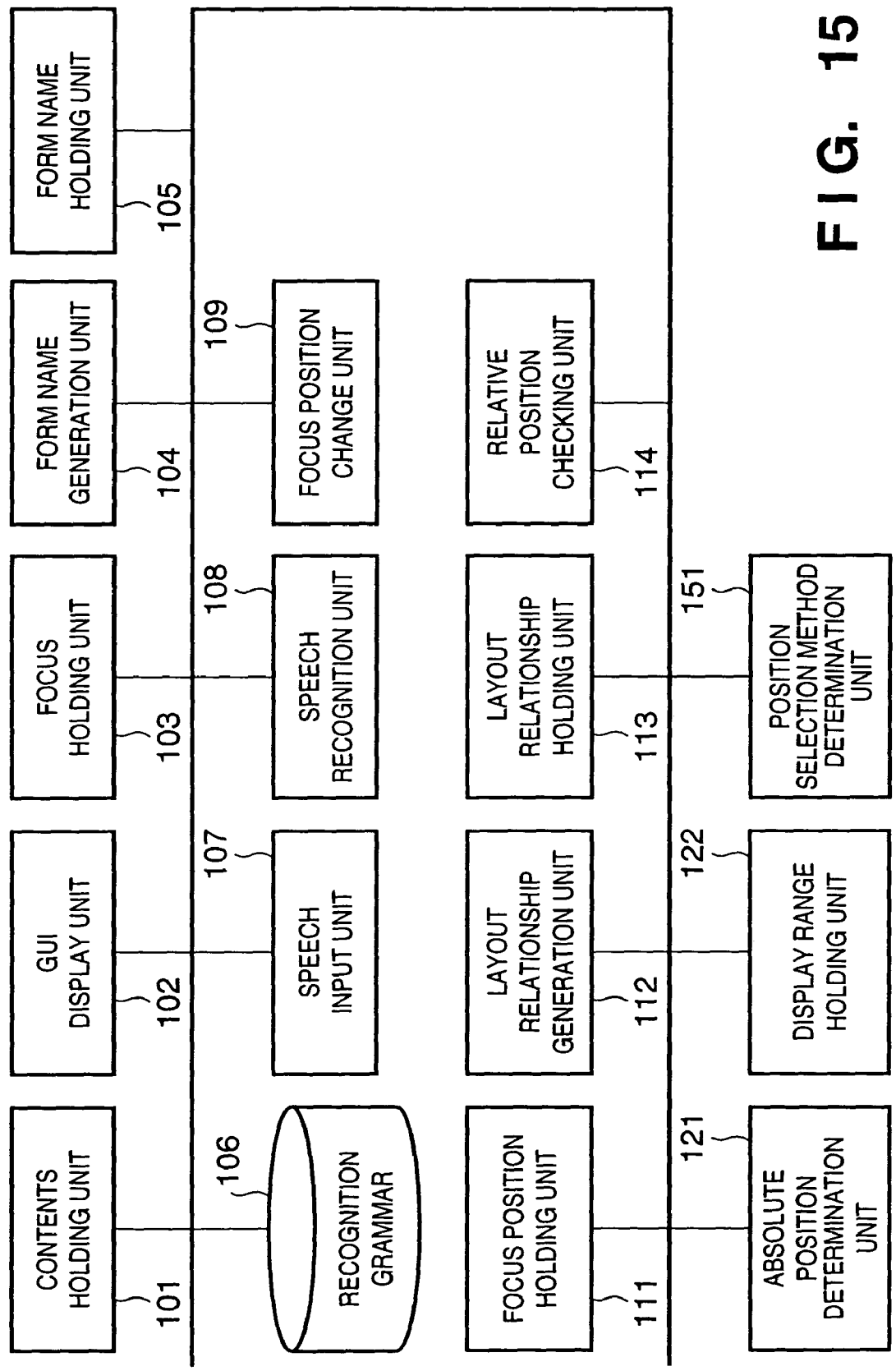
FIG. 15 is a functional block diagram of an information processing apparatus according to Embodiment 5 of the present invention.

The functional arrangement of the information processing apparatus according to such embodiment is shown in FIG. 15.

FIG. 15 is a functional block diagram of the information processing apparatus according to Embodiment 5 of the present invention.

Referring to FIG. 15, in addition to the respective building components of FIGS. 2, 10, and 14 of Embodiments 1 to 4, the apparatus has a position selection method determination unit 151 for determining the type (input form name, relative position expression, and absolute position expression) of a focus position selection method.

The process to be executed by the information processing apparatus of Embodiment 5 will be described below using FIG. 16.

Figure 16:
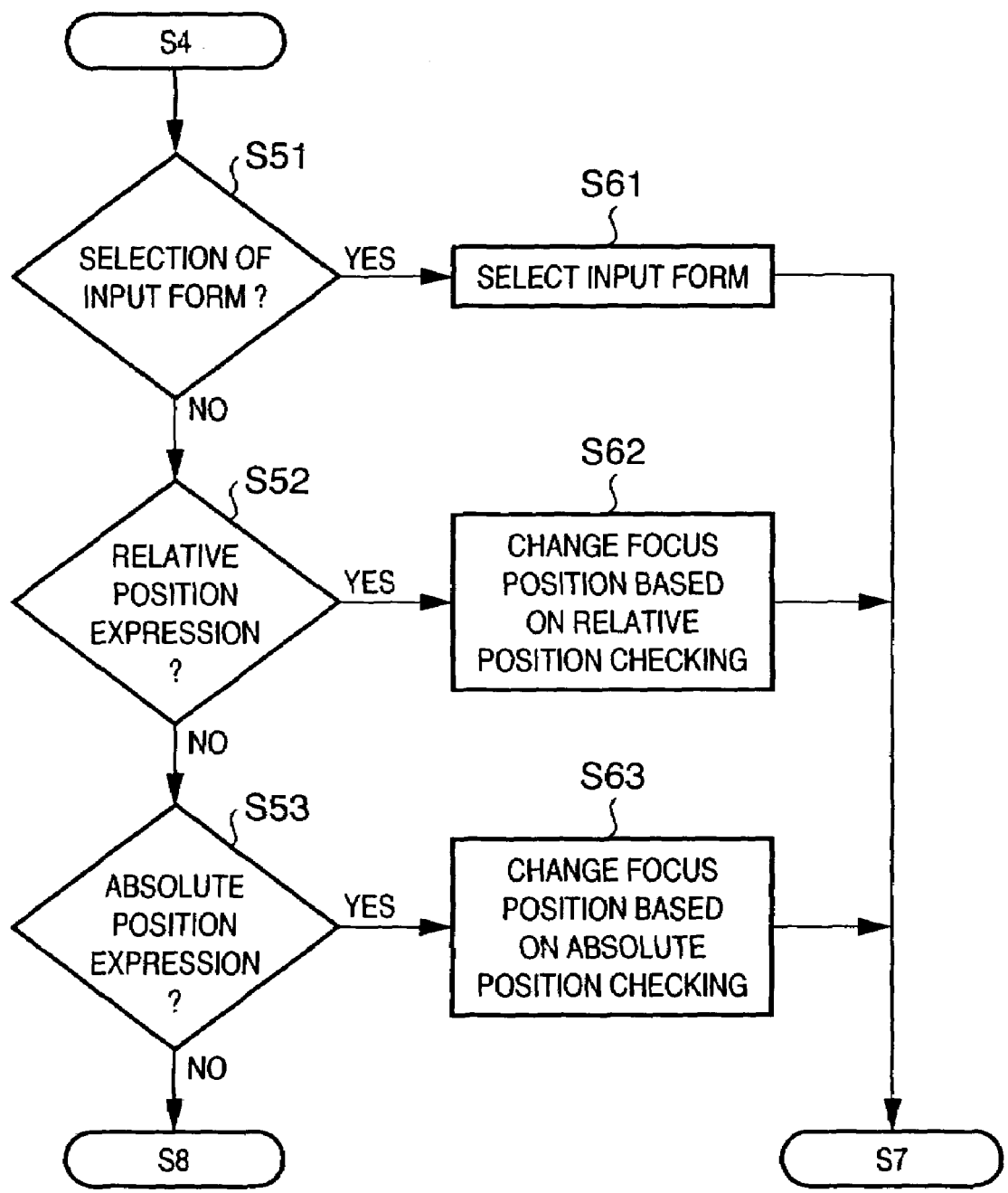
FIG. 16 is a flow chart showing a process executed by the information processing apparatus of Embodiment 5 of the present invention.

FIG. 16 is a flow chart showing the process to be executed by the information processing apparatus of Embodiment 5 of the present invention.

Note that FIG. 16 shows only portions different from the flow chart of FIG. 5 of Embodiment 1.

When the speech recognition unit 108 executes speech recognition of input speech data with reference to the read recognition grammar 106, the position selection method determination unit 151 determines with reference to the form name holding unit 105 in step S51 if the speech recognition result is selection of an input form. If the speech recognition result is selection of an input form (YES in step S51), the flow advances to step S61 to execute the same process as in step S6 in the flow chart of FIG. 5 of Embodiment 1. On the other hand, if the speech recognition result is not selection of an input form (NO in step S51), the flow advances to step S52.

The position selection method determination unit 151 determines in step S52 if the speech recognition result is a relative position expression. In this determination, for example, if the end of the speech recognition result is a position expression (e.g., "upper", "lower", "right", "left"), it is determined that the speech recognition result is a relative position expression.

If it is determined in step S52 that the speech recognition result is a relative position expression (YES in step S52), the flow advances to step S62 to execute the same processes as in steps S71 and S72 in FIG. 12 of Embodiment 2. On the other hand, if the speech recognition result is not a relative position expression (NO in step S52), the flow advances to step S53.

The position selection method determination unit 151 determines in step S53 if the speech recognition result is an absolute position expression. In this determination, for example, if the head of the speech recognition result is a position expression (e.g., "from top", "from bottom", "from right", or "from left", or "of overall", "in display range", and their synonyms), it is determined that the speech recognition result is an absolute position expression.

If it is determined in step S53 that the speech recognition result is an absolute position expression (YES in step S53), the flow advances to step S63 to execute a process for changing the focus position based on the absolute position expression, which has been explained in Embodiment 3 or 4. On the other hand, if the speech recognition result is not an absolute position expression (NO in step S53), the flow advances to step S8.

In the description of Embodiment 5, the focus position can be selected by the selection method using one of the input form name, relative position, and absolute position. Also, an arrangement capable of selecting the focus position using two or more arbitrary selection methods of those methods can be implemented, needless to say.

As described above, according to Embodiment 5, in addition to the effects described in Embodiments 1 to 4, since an input form can be selected by input speech by a plurality of types of selection methods, more flexible input form selection environment by means of input speech, which can be applied to various apparatuses, can be implemented.

<Embodiment 6>

When the contents held in the contents holding unit 101 are described using a markup language, the layout relationship holding unit 113 may hold the types of tags indicating input forms, and an input form may be selected by input speech like "n-th (tag name)". FIG. 17 shows the contents of the input form information table held in the layout relationship holding unit 113 in such arrangement. In such case, the absolute position determination unit 121 recognizes the first radio button as gender, and the second radio button as occupation. When the user inputs speech "second radio button", the focus position is moved to occupation, and the flow advances to step S7.

Note that the types of tags held in the layout relationship holding unit 113 are not limited to "input" and "radio", and the same process can be made if a "select" tag indicating a menu or an "a" tag" indicating a link destination is held.

As described above, according to Embodiment 6, since an input speech can be selected by input speech in accordance with the type of tag indicating an input form, more flexible input form selection by means of input speech can be implemented.

<Embodiment 7>

When contents are described using a markup language, there are many tags which are not used for speech recognition inputs such as a "center" tag indicating centering, "br" tag indicating a new line, and the like.

Hence, in Embodiment 6, the types of tags used in focus movement in speech recognition may be listed in a portion that declares speech recognition.

FIG. 18 shows an example of tags used to execute speech recognition using a markup language. In FIG. 18, an example of tags of speech recognition associated with Embodiment 7 is indicated, and the tags of speech recognition [<SpeechRecog . . . >] is a description for executing an input by speech recognition.

In the GUI display unit 102 in Embodiment 7, [<SpeechRecog . . . >] is interpreted as "to make speech recognition, and to display its speech recognition result". The recognition grammar 106 used in speech recognition, and a list of types of tags used in focus movement in speech recognition can be designated by [grammar] and [used_tag], respectively. In this example, a tag [<SpeechRecog . . . >] declares that a recognition grammar dictionary [command.grm] is used, and three different tags, i.e., "input" tag, "radio" tag, and "a" tag are used in focus movement.

As described above, according to Embodiment 7, since tags used to execute speech recognition are described in the contents together, the tags used to execute speech recognition can be determined more efficiently in the tags in the contents. Also, since the tags used to execute speech recognition are described for each contents, even when an input form is selected by input speech in accordance with the type of tag indicating an input form, the layout relationship holding unit 113 need not hold any input form information table in FIG. 17, and the storage resources can be saved.

Note that the present invention includes a case wherein the invention is achieved by directly or remotely supplying a program (a program corresponding to the illustrated flow chart in each embodiment) of software that implements the functions of the aforementioned embodiments to a system or apparatus, and reading out and executing the supplied program code by a computer of that system or apparatus. In such case, the form is not limited to a program as long as the program function can be provided.

Therefore, the program code itself installed in a computer to implement the functional process of the present invention using computer implements the present invention. That is, the present invention includes the computer program itself for implementing the functional process of the present invention.

In this case, the form of program is not particularly limited, and an object code, a program to be executed by an interpreter, script data to be supplied to an OS, and the like may be used as along as they have the program function.

As a recording medium for supplying the program, for example, a floppy disk, hard disk, optical disk, magnetooptical disk, MO, CD-ROM, CD-R, CD-RW, magnetic tape, nonvolatile memory card, ROM, DVD (DVD-ROM, DVD-R), and the like may be used.

As another program supply method, connection may be established to a given home page on the Internet using a browser on a client computer, and the computer program itself of the present invention or a file, which is compressed and includes an automatic installation function, may be downloaded from that home page to a recording medium such as a hard disk or the like, thus supplying the program. Also, program codes that form the program of the present invention may be broken up into a plurality of files, and these files may be downloaded from different home pages. That is, the present invention also includes a WWW server that makes a plurality of users download program files for implementing the functional process of the present invention using a computers.

Also, a storage medium such as a CD-ROM or the like, which stores the encrypted program of the present invention, may be delivered to the user, the user who has cleared a predetermined condition may be allowed to download key information that decrypts the program from a home page via the Internet, and the encrypted program may be executed using that key information to be installed on a computer, thus implementing the present invention.

The functions of the aforementioned embodiments may be implemented not only by executing the readout program code by the computer but also by some or all of actual processing operations executed by an OS or the like running on the computer on the basis of an instruction of that program.

Furthermore, the functions of the aforementioned embodiments may be implemented by some or all of actual processes executed by a CPU or the like arranged in a function extension board or a function extension unit, which is inserted in or connected to the computer, after the program read out from the recording medium is written in a memory of the extension board or unit.

The invention claimed is:

1. An information processing apparatus for executing a process with respect to a plurality of input forms included in content data displayed on a display screen on the basis of input speech, comprising:
    storage means for storing input form information, associated with each of said plurality of input forms, including layout information indicating a position of each of said plurality of input forms;
    first display control means for controlling to display at least a part of the content data on the display screen;
    speech recognition means for recognizing input speech to generate a speech recognition result;
    determination means for determining whether the speech recognition result includes an absolute position expression defined in terms of all of the content data or an absolute position expression defined in terms of a display range on the display screen;
    first selection means for selecting input form information based on the absolute position expression if the speech recognition result includes an absolute position expression defined in terms of all of the content data;
    second selection means for obtaining layout information of the display range currently displayed on the display screen and selecting input form information based on the absolute position expression and the obtained layout information if the speech recognition result includes an absolute position expression defined in terms of the display range on the display screen; and
    second display control means for controlling a display pattern of an input form corresponding to the input form information selected by said first or second selection means to distinguish the selected input form from other displayed input forms.

2. The apparatus according to claim 1, wherein the input form information includes an input form name of the input form.

3. The apparatus according to claim 1, wherein said second display control means displays the input form corresponding to the input form information selected by said first or second selection means in a second display pattern which is different from a first display pattern of other displayed input forms.

4. The apparatus according to claim 1, wherein said second display control means displays the input form corresponding to the input form information selected by said first or second selection means at a center of the display screen.

5. The apparatus according to claim 1, further comprising:
    outputting means for, when the input form information is selected by said first or second selection means, outputting a sound signal.

6. The apparatus according to claim 1, wherein, when the input form is implemented by a hypertext document, the input form information includes a tag indicating the input form.

7. An information processing method for executing a process with respect to a plurality of input forms included in content data displayed on a display screen on the basis of input speech, the input forms being associated with input form information, the input form information including layout information indicating a position of each of the plurality of input forms, the method comprising:
    a first display control step of controlling to display at least a part of the content data on the display screen;
    a speech recognition step of recognizing input speech to generate a speech recognition result;
    a determination step of determining whether the speech recognition result includes an absolute position expression defined in terms of all of the content data or an absolute position expression defined in terms of a display range on the display screen;
    a first selection step of selecting input form information associated with an input form, based on the absolute position expression if the speech recognition result includes an absolute position expression defined in terms of all of the content data;
    a second selection step of obtaining layout information of the display range currently displayed on the display screen and selecting input form information based on the absolute position expression and the obtained layout information if the speech recognition result includes an absolute position expression defined in terms of the display range on the display screen; and
    a second display control step of controlling a display pattern of the input form corresponding to the input form information selected in the first or second selection step to distinguish the selected input form from other displayed input forms.

8. The method according to claim 7, wherein the input form information includes an input form name of the input form.

9. The method according to claim 7, wherein the second display control step includes the step of displaying the input form corresponding to the input form information selected in the first or second selection step in a second display pattern which is different from a first display pattern of other displayed input forms.

10. The method according to claim 7, wherein the second display control step includes the step of displaying the input form corresponding to the input form information selected in the first or second selection step at a center of the display screen.

11. The method according to claim 7, further comprising:
an outputting step of, when the input form information is selected in said first or second selection step, outputting a sound signal.

12. The method according to claim 7, wherein, when the input form is implemented by a hypertext document, the input form information includes a tag indicating the input form.

13. A program for making a computer function as an information processor for executing a process with respect to a plurality of input forms included in content data displayed on a display screen on the basis of input speech, the input forms being associated with input form information, the input form information including layout information indicating a position of each of the plurality of input forms, the method comprising:

program code for a first display control step of controlling to display at least a part of the content data on the display screen;

program code for a speech recognition step of recognizing input speech to generate a speech recognition result;

program code for a determination step of determining whether the speech recognition results includes an absolute position expression defined in terms of all of the content data or an absolute position expression defined in terms of a display range on the display screen;

program code for a first selection step of selecting input form information associated with an input form, based on the absolute position expression if the speech recognition result includes an absolute position expression defined in terms of all of the content data;

program code for a second selection step of obtaining layout information of the display range currently displayed on the display screen and selecting input form information based on the absolute position expression and the obtained layout information if the speech recognition result includes an absolute position expression defined in terms of the display range on the display screen; and program code for a second display control step of controlling a display pattern of the input form corresponding to the input form information selected in the first or second selection step to distinguish the selected input form from other displayed input forms.

* * * * *

UNITED STATES PATENT AND TRADEMARK OFFICE
CERTIFICATE OF CORRECTION

PATENT NO. : 7,165,034 B2 Page 1 of 1
APPLICATION NO. : 10/653210
DATED : January 16, 2007
INVENTOR(S) : Keiichi Sakai et al.

It is certified that error appears in the above-identified patent and that said Letters Patent is hereby corrected as shown below:

COLUMN 13
Line 23, "a" should be deleted.

COLUMN 16
Line 7, "results" should read --result--.

Signed and Sealed this

Fifth Day of June, 2007

JON W. DUDAS
*Director of the United States Patent and Trademark Office*

UNITED STATES PATENT AND TRADEMARK OFFICE
CERTIFICATE OF CORRECTION

PATENT NO. : 7,165,034 B2  Page 1 of 1
APPLICATION NO. : 10/653210
DATED : January 16, 2007
INVENTOR(S) : Sakai et al.

It is certified that error appears in the above-identified patent and that said Letters Patent is hereby corrected as shown below:

On the Title page,

[*] Notice: Subject to any disclaimer, the term of this patent is extended or adjusted under 35 USC 154(b) by (106) days Delete the phrase "by 106" and insert -- by 79 days--

Signed and Sealed this

Fourth Day of December, 2007

JON W. DUDAS
*Director of the United States Patent and Trademark Office*